Figure 1:
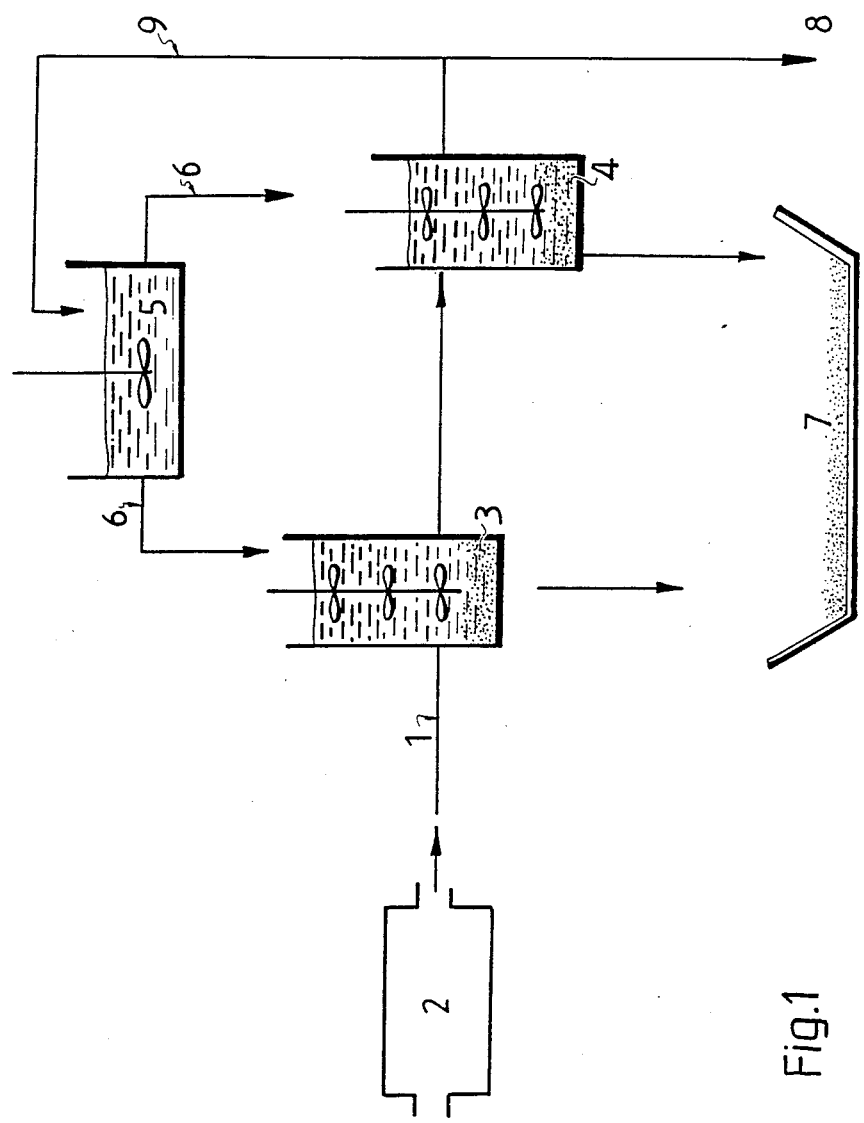

United States Patent [19]

Mainwaring et al.

[11] Patent Number: 4,976,781
[45] Date of Patent: Dec. 11, 1990

[54] MINERAL RECOVERY PROCESS

[75] Inventors: David Mainwaring, North Balwyn; Mark Cadzow, North Fitzroy, both of Australia

[73] Assignee: Charlton Mineral Associates Pty. Ltd., Victoria, Australia

[21] Appl. No.: 88,054

[22] Filed: Aug. 21, 1987

[30] Foreign Application Priority Data

Aug. 21, 1986 [AU] Australia .................. PH7589

[51] Int. Cl.$^5$ ................................. C22B 11/00
[52] U.S. Cl. ........................... 75/710; 75/747; 423/446; 156/DIG. 68; 209/5
[58] Field of Search ............... 423/446; 156/DIG. 68; 75/1 R, 118 R, 710, 747; 209/5

[56]     References Cited
         U.S. PATENT DOCUMENTS

| | | | |
|---|---|---|---|
| 714,914 | 12/1902 | Keith | 75/1 R |
| 817,411 | 4/1906 | Corning | 75/1 R |
| 2,709,676 | 5/1955 | Krebs | 423/DIG. 16 |
| 4,256,705 | 3/1981 | Heinen et al. | 423/27 |
| 4,501,593 | 2/1985 | Paersch et al. | 44/23 |
| 4,585,548 | 4/1986 | Cadzow et al. | 210/633 |

FOREIGN PATENT DOCUMENTS 58921  6/1921  Australia ................. 210/633

OTHER PUBLICATIONS

The History and Use of Diamond, Tolansky Methuen & Co. Ltd, London 1962, pp. 122-123.

*Primary Examiner*—Theodore Morris
*Assistant Examiner*—Paige C. Harvey
*Attorney, Agent, or Firm*—Charles E. Pfund

[57]     ABSTRACT

Noble metal or diamond values are recovered from ore slurries by contact with pellets of oil, coal and bitumen as a secondary binder. The pellets are of a size above 0.75 mm and contain 2% bitumen and 18% lighter oil fractions. The pellets do not disintegrate and size range remains constant.

8 Claims, 1 Drawing Sheet

MINERAL RECOVERY PROCESS

This invention relates to the recovery of noble metal or diamond values from an ore body and in particular from ores in which the noble metal is present in low concentration.

It is known that noble metals do have Lyophillic properties. Australian Pat. No. 589/21 discloses a method of concentrating iron fines from steel mills, mineral concentrates and other metalliferous substances using coal and oil to form agglomerates.

U.S. Patent to Cadzow et al No. 4,585,548 discloses a method of recovering a mineral having a Lyophillic surface in which powdered coal and oil is added to a mineral slurry and agitated in a contact zone to form agglomerates. Key features of this process are the collection of mineral during the process of agglomerate disintegration and reformation by the recycle of agglomerates back to the contact zone and maintenance of agglomerates in the contact zone below 500 microns in size.

The present invention has as its object to provide a process of recovering a noble metal or diamonds which has relatively low residence times and high retention of noble metals or diamonds in the agglomerate.

To this end the present invention provides a method of recovering noble metal or diamond values from an ore comprising grinding the ore if required and forming a slurry adding to such ore slurry in a contacting zone pellets formed from a ground carbonaceous material, a hydrocarbon liquid and a secondary solid binder to retard pellet disintegration, removing pellets from said zone and recovering noble metal or diamonds which has become associated with said pellets in said contacting zone.

The secondary solid binder is chosen to allow coal-oil agglomerate pellets to be formed that withstand the high shear forces in an agitated vessel. High shear forces are necessary to attain efficient particle collisions between the noble metal or diamond particle and the collecting pellet.

The secondary solid binder may be bitumen. Control of the pellet strength and plasticity can be accomplished by selection of the grade and type of bitumen.

The consequences and advantages of utilizing secondary solid binder such as bitument are:
(i) Pellets are able to withstand high shear forces in the mineral contacting stages, resulting in no disintegration.
(ii) This enables a continuous contacting system to be operated.
(iii) Avoidance of pellet disintegration which causes coal losses in the contacting stage and hence loss of precious metal from the agitated vessel. If coal loaded with precious metal is lost, other process techniques and equipment must be employed to regain this. This becomes more critical as the pellets are loaded with precious metal.
(iv) The secondary solid binder stabilizes the pellet size distribution thereby preventing a decrease in collision kinetics with an unstabilized growing pellet size population.

Secondary binders allow the agglomerate pellet size distribution to be maintained thereby allowing the process to be operated as a conventional stirred tank contactor with a pellet inventory kept in the vessel.

Noble metals or diamonds are collected by preferential surface wetting by oil films supported on and in the pellet collector. The pellet is merely a vehicle for transporting the oil films in a form which is easily contacted and separated from the mineral pulp. The process is one of pellet collection and the properties of the pellets are influenced by the binder. Residence times for the pellets in the contacting zone is at least two minutes preferably two to twenty minutes and more preferably three to ten minutes.

The binder achieves pellets that have a plasticity that minimizes breakage and loss from the external surface where the precious metal concentration is highest. Through collision and contact precious metal is retained by capillary suction pressure.

In a preferred form of this invention the coal oil agglomerate pellets are first made separately for subsequent use. Coal, oil and secondary solid binder are agitated in an agglomerated tank to yield pellets of a predetermined size distribution and strength. These are agitated until the equilibrium size appropriate to the solid binder type is achieved. The pellet size ,range used is between 0.75 mm and 5.00 mm with a preferable range of 1 to 4 mm. Preferably pellets contain 1 to 5% by weight of the secondary binder and 15 to 25% by weight of oil.

This invention is suitable for recovery of gold, platinum, palladium, silver and diamonds. The coal or carbon material used is any suitable coal that is available.

A schematic illustration of the equipment is shown in FIG. 1. After formation of the pellets 6 in the agglomerator 5 the pellets are then charged to the appropriate contacting vessels into which a continuous stream of noble metal or diamond containing ore slurry is passed. With the above agglomerate formulation the pellet strength achieved allows the tank 3 to be operated under high shear conditions while still maintaining the total integrity of the pellets 6. This increases the precious metal capture efficiency.

The slurry 1 contains ground ore of the slurry and grinding is formed in the crusher 2.

The agglomerate pellets 6 are retained in the tank with a holding screen allowing the depleted ore to pass the screen and exit the tank 3. The depleted ore from the first contacting tank 3 then passes to a second tank 4 where it is further contacted with agglomerate pellets and further depleted as the tailings stream 8. The number of stages required is established by conventional engineering practice for continuous contacting.

The loaded pellets 7 are removed periodically from the contacting tanks 3 and 4 and form the product for subsequent metal recovery by conventional techniques. Rejects 8 from the process forms the conventional ore tailings. Oil 9 skimmed from the tailings 8 is recycled to the pellet agglomorator 5. The agglomerate composition allows turbulent contacting with the ore slurry with no disintegration and precious metal capture is by preferential surface wetting of the oil component onto the hydrophobic precious metal surface. The metal values are then incorporated within the liquid oil lenses in the capillaries of the agglomerate particle. The absence of disintegration allows for a once through contacting system with no requirements for recycle of the agglomerate pellets. Hence the agitated vessel is purely a contacting zone for the collection of precious metal values. The usual residence time in such a contacting device is in the range of 1 to 10 minutes.

Continuous contacting experiments were carried out with a gold bearing ore.

Agglomerates were initially made with the techniques discribed earlier but at various levels of secondary solid binder, in this case bitumen.

Pulverized bituminous coal was agglomerated to form pellets with the following formulations. The oil composition varied between 17 wt.% and 21 wt.% on a coal basis and the solid binder varied between 0 wt.% and 4 wt.% on a coal basis respectively. Pellets were made in the size range plus 0.75 mm minus 2.00 mm that is, sizes which pass through a 2.00 mm mesh screen but are retained on a 0.75 mm mesh screen.

EXAMPLE 1

Turbulent contacting with gold bearing ore slurry was carried out at a coal to ore ratio of 1:1. Ore was passed through the agitated vessel for three hours during which time agglomerate breakdown and pellet losses through a 500 micron screen were measured. The following results were obtained:

| % Solid Binder | % Pellet Loss from Vessel | % Gold Recovered in Pellets |
|---|---|---|
| 0 | 0.83 | 56 |
| 2 | 0.12 | 75 |
| 4 | 0.08 | 75 |

The influence of the solid binder is clearly demonstrated in both the % pellet loss and consequent gold recovery. Gold recovery is particularly sensitive to coal loss via pellet breakdown.

EXAMPLE 2

Experiments were carried out to determine the efficiency of gold capture with pellet agglomerates containing various levels of solid binder. Analysis of the feed ore and tailings from a single pass continuous contacting gave the following results.

| % Solid Binder | Head Grade grams/Ton | Tailings Grade grams/Ton | % Gold Recovery |
|---|---|---|---|
| 0 | 1.70 | 0.75 | 56 |
| 2 | 1.73 | 0.50 | 71 |
| 4 | 2.19 | 0.43 | 80 |

The influence of solid binder in increasing the collection and retention of gold particles is clearly seen in these results.

EXAMPLE 3

A second continuous contacting experiment was carried out with similar agglomerates (4% solid binder) to the above except that the size range was plus 0.85 mm and minus 2.36 mm. The pellet size distribution after three hours of continuous high turbulent contacting was determined. The following results were obtained.

Pellet Size Distribution (4% solid binder)

| Pellet Size Distribution (4% solid binder) | | |
|---|---|---|
| mm. | Initial | Final |
| +2.36 | 0 | 0 |
| −2.36, +1.70 | — | 18.0 |
| −1.70, +0.85 | — | 82.0 |

| Pellet Size Distribution (4% solid binder) | | |
|---|---|---|
| mm. | Initial | Final |
| −0.85 | 0 | 0 |

This demonstrates that there is no breakdown into the size range minus 0.85 mm and that the total pellet size distribution is stabilzied. That is there is no growth in pellet size due to continued agitation. This would lead to inefficiency in contacting and precious metal recovery.

EXAMPLE 4

Continuous contacting runs were carried out to show the effect of selecting both binder type and oil type on the performance of the collecting pellets. Continuous contacting was carried out in a series of 3 contacting vessels with feed flowing from one to the next vessel under gravity. Runs were carried out at the same ore throughput (5.88 kg/hr) for various times up to about 3.5 hours. To compare results runs have been expressed on a % Pellet loss from Vessel on a similar kg ore throughput basis.

| | Pellet Composition | | % Pellet Loss from Vessel |
|---|---|---|---|
| (a) | 2% 280/7 Bitumen | Tank 1 | 1.25 |
| | 18% Heavy Fuel Oil | Tank 2 | 1.17 |
| | | Tank 3 | 1.13 |
| (b) | 2% 280/7 Bitumen | Tank 1 | 0.00 |
| | 18% light gas oil- | Tank 2 | 1.46 |
| | 3.6% Light Fuel Oil | | |
| | 14.4% Diesel | Tank 3 | 1.46 |
| (c) | light gas oil returned to Tank 1 | | |
| | 2% 280/7 Bitumen | Tank 1 | 0.21 |
| | 18% light gas oil- | Tank 2 | 0.00 |
| | 3.6% Light Fuel Oil | | |
| | 14.4% Diesel | Tank 3 | 0.00 |

EXAMPLE 5

Batch experiments were carried out on three samples of a gold ore, two of which had received previous treatment by conventional mineral processing. Collecting pellets had the binder and oil compositions found in example 4(c) above.

| Sample | Average Assays grams/Ton | | % Recovery Total |
|---|---|---|---|
| | Head | Tailings | |
| Feed | 0.39 | less 0.01 | 98.8 |
| Primary Jig Tails | 0.23 | less 0.01 | 97.9 |
| Secondary Jig Tails | 0.12 | 0.01 | 94.2 |

It can be seen that control of attrition of the pellets allows high recoveries to be achieved and that this simple process of collection is effective on process tailings from other separation processes e.g. Jigs that may have operating advantages in a different size or liberation characteristic of a complex ore.

EXAMPLE 6

Noble metals from an ore concentrate were recovered in experiments to evaluate the simultaneous recovery of platinum, palladium and gold. Concentrate was diluted with both milled quartz and and gold mining tailings to give lower levels in the feed. Feed was divided into two size fractions (0.05×0 mm) and (0.25×0 mm) and processed to give the following recoveries.

|  | Average Assays grams/Ton | | % Recovery |
| --- | --- | --- | --- |
|  | Head | Tailings | Total |
| Experiment 1 0.05 × 0 mm | | | |
| Platinum | 6.04 | 0.08 | 98.8 |
| Palladium | 0.09 | 0.001 | 94.4 |
| Gold | 1.17 | 0.06 | 94.8 |
| Experiment 2 0.25 × 0 mm | | | |
| Platinum | 45.4 | 0.05 | 99.9 |
| Palladium | 0.43 | 0.001 | 99.8 |
| Gold | 1.25 | 0.004 | 99.6 |

This invention has shown that by control of the pellet strength and plasticity, deformable pellets without breakage or attrition, suitable for high levels of noble metal recovery, can be accomplished. This is achieved by the use of binder(s). Control is achieved by the selection of binder type and grade and optimized by matching oil type to binder type.

Since increased efficiencies for the capture of precious metal particles are promoted by high collision frequencies, then high degrees of turbulence are required in the stirred pellet collecting vessel (contacting vessel). To gain the process advantages of operating the noble metal or diamond collecting vessels as merely stirred tanks with a fixed inventory of collecting pellets, control of pellet breakage and attrition is required. The pellet formulations of this invention optimize plasticity and integrity and remove the requirement for recycle of agglomerates.

Research on the capture efficiency of noble metal or diamond particles showed that an inventory of larger spherical pellets was as effective as broken agglomerates or agglomerates below 500 microns. Thus this process has the advantage of removing the need for breakage and recycle of microagglomerates to give higher recovery efficiencies.

The pellet formulation to control these material properties selects suitable carbonaceous matrix materials, binder(s) and wetting oil type.

Such an elastic/visco solid pellet is able to absorb the energy of collisions through plastic deformation thereby preventing breakage and utilizing some of the collision energy into transporting of the noble metal or diamond particles toward the pellet core.

Since collection of the noble metals or diamonds is by preferential surface wetting by the oil films supported by the pellet, the amount of such oil films must be kept optimal. Higher oil contents in the agglomerate pellets leads to instability in the number and size of agglomerate pellets. An advantage of the pellet formulation of this invention is that low viscosity oil can be used at oil contents that are optimal for collection but pellet sizes and numbers are maintained in a stable distribution. A consequence of not using the binder would be a decrease in pellet number, increase in pellet size and a decrease in collision frequency under the shear conditions for optimal ore contacting, with consequential increase in residence time and power input.

From the above it can be seen that this invention provides a simple stirred tank contacting process with pre-made pellets of selected composition with respect to carbonaceous matrix, oil type and binder type. Oil levels in the pellet can be kept high and pellet inventories stable by the use of binders. Attrition and coal loss can be removed by the use of plastically deformable pellets of sufficient strength by the selection of oil type and binder type.

The claims defining the invention are as follows:

1. A method of recovering noble metal or diamond values from an ore comprising:
    forming a slurry of the ore,
    adding to said slurry in a contacting zone pellets preformed from a carbonaceous material, a hydrocarbon liquid, and a secondary solid binder,
    said secondary solid binder selected to form plastically deformable pellets of sufficient strength to withstand high shear forces present in said contacting zone without substantial attrition,
    said hydrocarbon liquid selected for optimal collection of said noble metal or diamond values while maintaining pellet sizes and numbers in substantially stable distribution;
    agitating the slurry and pellet mixture in said contacting zone to produce continuous contacting between the ore and pellets, and
    removing pellets from said contacting zone and recovering noble metal or diamonds which have become associated principally by preferential surface wetting with said pellets in said contacting zone.

2. A method as claimed in claim 1 wherein said pellets are formed from coal, oil and bitumen.

3. A method as claimed in claim 1 or 2 wherein the ore slurry is subjected to grinding before contact with said pellets.

4. A method as claimed in claims 1 or 2 in which the pellets have a size of between 0.75 mm to 5 mm.

5. A method as claimed in claim 2 wherein the pellets contain from 1 to 5% by weight of bitumen and from 15 to 25% by weight of oil.

6. A method as claimed in claims 1 or 2 wherein the time said pellets remain in said contacting zone is from 1 to 10 minutes.

7. A method as claimed in claim 4 wherein the pellets contain from 1 to 5% by weight of bitumen and from 15 to 25% by weight of oil.

8. A method as claimed in claim 7 wherein the time said pellets remain in said contacting zone is from 1 to 10 minutes.

* * * * *